(12) United States Patent
Kitamura

(10) Patent No.: US 7,734,769 B2
(45) Date of Patent: Jun. 8, 2010

(54) MONITORING SYSTEM OF APPARATUSES CONNECTED IN A NETWORK, MONITORING APPARATUS, MONITORING METHOD AND PROGRAM

(75) Inventor: Toshikazu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

(21) Appl. No.: 11/422,706

(22) Filed: Jun. 7, 2006

(65) Prior Publication Data

US 2007/0088682 A1    Apr. 19, 2007

(30) Foreign Application Priority Data

Oct. 19, 2005    (JP)    ............................... 2005-304277

(51) Int. Cl.
*G06F 15/16* (2006.01)
(52) U.S. Cl. ........................ 709/224; 709/223; 709/216; 709/218
(58) Field of Classification Search ................ 709/223, 709/224, 212, 216, 218
See application file for complete search history.

(56) References Cited

U.S. PATENT DOCUMENTS

| | | | | |
|---|---|---|---|---|
| 6,944,135 | B2 * | 9/2005 | Novaes | 370/256 |
| 2002/0135615 | A1 * | 9/2002 | Lang | 345/764 |
| 2003/0182416 | A1 * | 9/2003 | Yamabe | 709/223 |

FOREIGN PATENT DOCUMENTS

| | | |
|---|---|---|
| JP | 2001-75837 | 3/2001 |
| JP | 2002-312199 | 10/2002 |

* cited by examiner

*Primary Examiner*—Djenane M Bayard
(74) *Attorney, Agent, or Firm*—Whitham Curtis Christofferson & Cook, PC

(57) ABSTRACT

A system includes a plurality of apparatuses connected to a network, wherein each apparatus monitors the occurrence of trouble in a monitoring object apparatus which is one of the apparatuses in the system. Further, each apparatus is monitored for the occurrence of trouble in the apparatus by a monitor apparatus which is another one of the apparatuses in the system. The system enables adding and subtracting apparatuses to the system, as well as restoring apparatuses which were previously subtracted due to detected troubles which have been corrected.

18 Claims, 18 Drawing Sheets

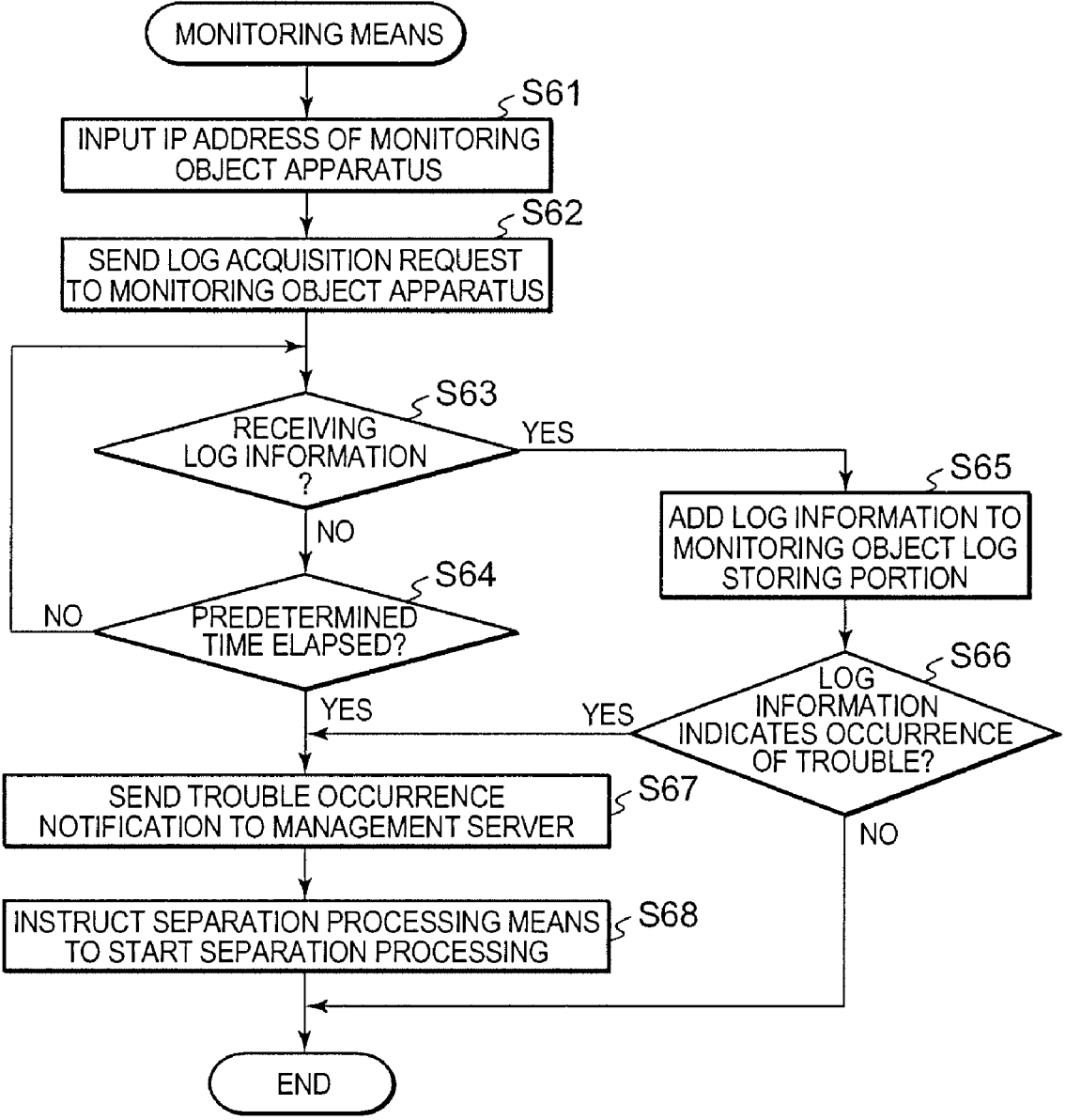

MONITORING SYSTEM OF APPARATUSES CONNECTED IN A NETWORK, MONITORING APPARATUS, MONITORING METHOD AND PROGRAM

BACKGROUND OF THE INVENTION

1. Field of the Invention

The present invention relates to a monitoring technology for monitoring whether or not trouble has occurred in an apparatus connected to a network, such as a computer, a telephone exchange system or a process controller. Particularly, the present invention relates to a mutual monitoring technology in which an apparatus connected to a network monitors whether or not trouble has occurred in another apparatus connected to the network.

2. Description of the Related Art

Technologies in which an apparatus connected to a network monitors another apparatus connected to a network include the following technologies.

In the related art described in Japanese Patent Published Application No. 2001-75837, each computer to be monitored regularly sends to other computers a packet including its identifier. The packet is sent by broadcast or multicast. Each computer contains a component information storing portion where identifiers of all computers to be monitored are registered. If the identifier of a computer is registered in that storing portion of other computers and a packet from that computer has not been received within a predetermined time, the other computers determine that trouble has occurred in that computer from which a packet has not been received.

This related art has a problem of increasing the load on a network because it is necessary to send a packet by broadcast or multicast. Further, this related art has a problem of requiring a large memory size for the component information storing portion if there are a large number of computers to be monitored. It is also not easy to add a new computer to be monitored. This is because it is required that the identifier of all computers to be monitored should be registered in the storing portion of each computer for use in broadcast or multicast.

In the related art described in Japanese Patent Published Application No. 2002-312199, each computer to be monitored has a list showing an order of inquiry of each computer. Namely, in this list, identifiers of all computers to be monitored are linked by pointers in an order of inquiry. In this list, the pointer of the last computer shows the identifier of the first computer. That is, this list is a ring type order list. Each computer sends back a response upon inquiry from another computer. Each computer recognizes the first computer to which the inquiry is made based on that ring type order list retained by itself, and inquires of that first computer. If a response is given to that inquiry from the first computer, it is determined that the first computer is normal, and processing is ended. If no response is given from the first computer, it is determined that trouble has occurred in the first computer. In this case, further, each computer inquires of the second computer in the order of inquiry based on the ring type order list. If a response is given from the second computer, it is determined that the second computer is normal, and processing is ended. In this case, the second computer which sends back a response, performs processing same as the processing described above based on the ring type order list retained by the second computer.

This related art has a problem of requiring a large memory size when there area large number of computers to be monitored. It is also not easy to add a new computer to be monitored. This is because it is necessary for each computer to retain the ring type order list in which identifier of all computers to be monitored is linked by pointers.

SUMMARY OF THE INVENTION

According to the present invention, each mutual monitoring apparatus in the mutual monitoring system can monitor whether or not trouble has occurred in another mutual monitoring apparatus with a small memory size even if there are a large number of mutual monitoring apparatuses to be monitored in the mutual monitoring system. A new mutual monitoring apparatus can easily be added to the mutual monitoring system.

The reason for this is that each mutual monitoring apparatus retains only information about a monitoring object apparatus and information about a monitor apparatus. Namely, since only information about two apparatuses is retained, the memory size can be reduced as compared to the related art in which identifiers of all mutual monitoring apparatuses to be monitored should be retained. The number of other monitoring apparatuses for which information should be changed when a new monitoring apparatus to be monitored is added to the mutual monitoring system can be also reduced.

The favorable effect described above of the present invention is achieved as explained below.

In the present invention, a mutual monitoring system comprises a plurality of mutual monitoring apparatuses connected to a network. The mutual monitoring apparatus in the mutual monitoring system monitors the occurrence of trouble in a monitoring object apparatus which is one of the mutual monitoring apparatuses in the mutual monitoring system and, is also monitored for the occurrence of a trouble in that mutual monitoring apparatus by a monitor apparatus which is another one of the mutual monitoring apparatuses in that mutual monitoring system.

The mutual monitoring apparatus, in an exemplary embodiment, comprises a management information storing portion in which a monitoring object identifier and a monitor identifier are registered, a monitoring unit that monitors the monitoring object apparatus indicated by the monitoring object identifier, and a responding unit that responds to the monitoring of the monitor apparatus indicated by the monitor identifier.

The mutual monitoring system, in the exemplary embodiment, further comprises separation processing unit. That unit, for exemplary purposes, may comprise a searching unit and a management information changing unit. The searching unit searches for a search target apparatus in the mutual monitoring apparatuses in the mutual monitoring system. The management information changing unit changes the monitoring object identifier registered in the mutual monitoring apparatus to the identifier of the search target apparatus, and changes the monitor identifier registered in the search target apparatus to the identifier of the mutual monitoring apparatus.

The searching unit, in an exemplary embodiment, searches the search target apparatus by sequentially requesting other mutual monitoring apparatuses in the mutual monitoring system to send back the monitor identifier registered in the requested mutual monitoring apparatus, and determines as the search target apparatus the mutual monitoring apparatus which sends back the monitor identifier which indicates the monitoring object apparatus of the mutual monitoring apparatus. Such request, for example, begins with the monitor apparatus of the mutual monitoring apparatus and then is sequentially made to the monitor apparatus of the mutual monitoring apparatus sending back the monitor identifier in response to the request.

The searching unit also, in the exemplary embodiment, searches the search target apparatus by requesting by broadcast other mutual monitoring apparatuses in the mutual monitoring system to send back the monitor identifier registered in the requested mutual monitoring apparatus, and determines as the search target apparatus the mutual monitoring apparatus which sends back the monitor identifier which indicates the monitoring object apparatus of the mutual monitoring apparatus.

In the present invention, in the exemplary embodiment, 1) the mutual monitoring apparatus further comprises a log information storing portion in which log information of the monitoring object apparatus are registered, and a log collecting unit that collects log information of the mutual monitoring apparatus, 2) the responding unit sends back the log information of the mutual monitoring apparatus collected by the log collecting unit to the monitor apparatus in response to a log acquirement request from the monitor apparatus, 3) the monitoring unit sends the log acquirement requests to the monitoring object apparatus and registers the log information sent back in the log information storing portion, and if the log information is not sent back, determines that trouble has occurred in the monitoring object apparatus, and 4) the separation processing unit of the mutual monitoring apparatus further comprises a log information updating unit that updates the log information registered in the log information storing portion with the log information received from the monitoring object apparatus.

The mutual monitoring apparatus, in the exemplary embodiment, may further comprise a selection unit that selects a first mutual monitoring apparatus and a second mutual monitoring apparatus from the mutual monitoring apparatuses in the mutual monitoring system and a management information managing unit that registers the identifier of the mutual monitoring apparatus as the monitor identifier of the first mutual monitoring apparatus and as the monitoring object identifier of the second mutual monitoring apparatus, registers the identifier of the first mutual monitoring apparatus as the monitoring object identifier of the mutual monitoring apparatus, and registers the identifier of the second mutual monitoring apparatus as the monitor identifier of the mutual monitoring apparatus.

The invention includes a mutual monitoring method and a signal-bearing medium tangibly embodying a program of machine-readable instructions executable by a digital programming apparatus. The method and program are implemented in a mutual monitoring system comprising a plurality of the mutual monitoring apparatuses connected to a network, and with a management information storing portion in which a monitoring object identifier and a monitor identifier are registered. The program executes the respective steps of the mutual monitoring method according to the present invention.

BRIEF DESCRIPTION OF THE DRAWINGS

FIG. 6 is a flowchart showing an example of processing by monitoring means 12A;

DETAILED DESCRIPTION OF THE INVENTION

An embodiment of the present invention will be described in detail below with reference to the drawings. In the explanations described below, suffixes B, C, D, . . . are added when means and the like in the apparatuses 1B, 1C, 1D, . . . are shown. For example, when monitoring means belonging to the apparatus 1C is shown, it is described as monitoring means 12C.

Figure 1:
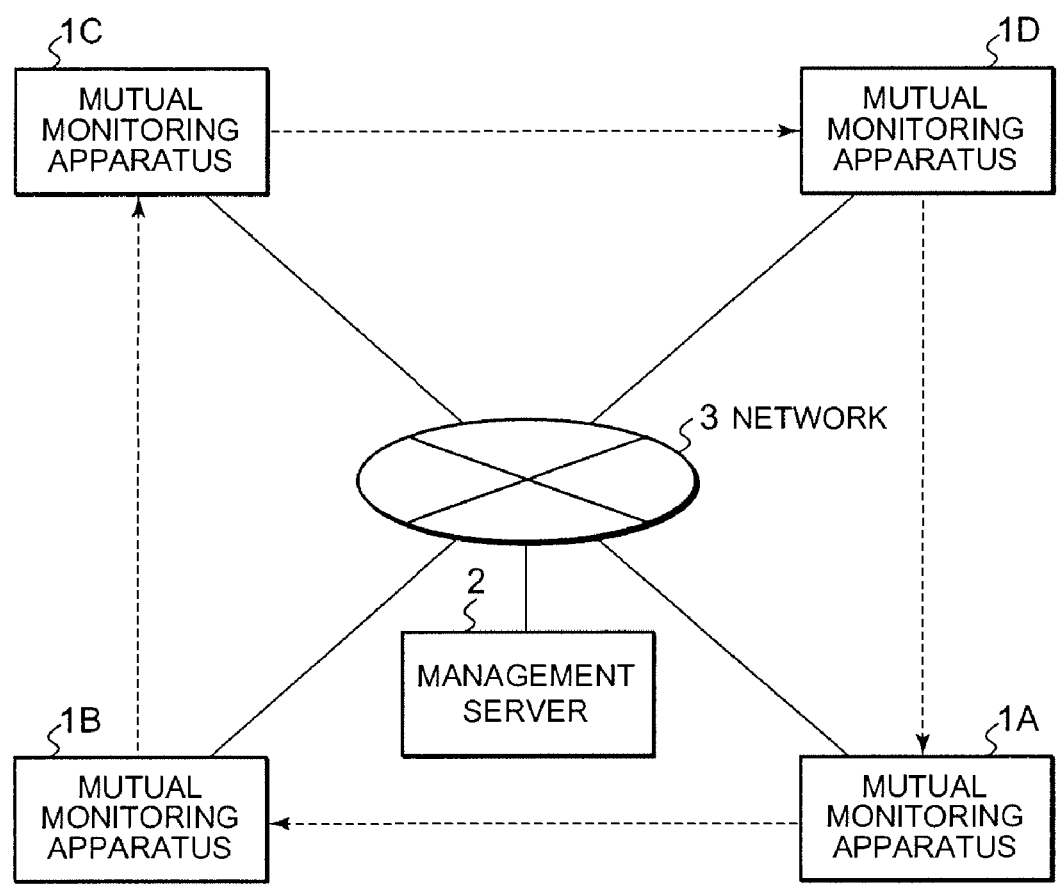
FIG. 1 is a block diagram showing an example of the configuration of a mutual monitoring system according to the present invention.

FIG. 1 is a block diagram showing an example of the configuration of an embodiment of a mutual monitoring system according to the present invention. In the example of the configuration, the mutual monitoring system is comprised of a plurality of mutual monitoring apparatuses 1A to 1D, each of which is an apparatus such as computers connected to a network, a management server 2, and a network 3 for connecting those apparatuses. In this embodiment, mutual monitoring apparatuses 1A, 1B, 1C and 1D monitor mutual monitoring apparatuses(from hereon in the detailed description of the invention simply referred as apparatus) 1B, 1C, 1D and 1A, respectively.

Figure 2:
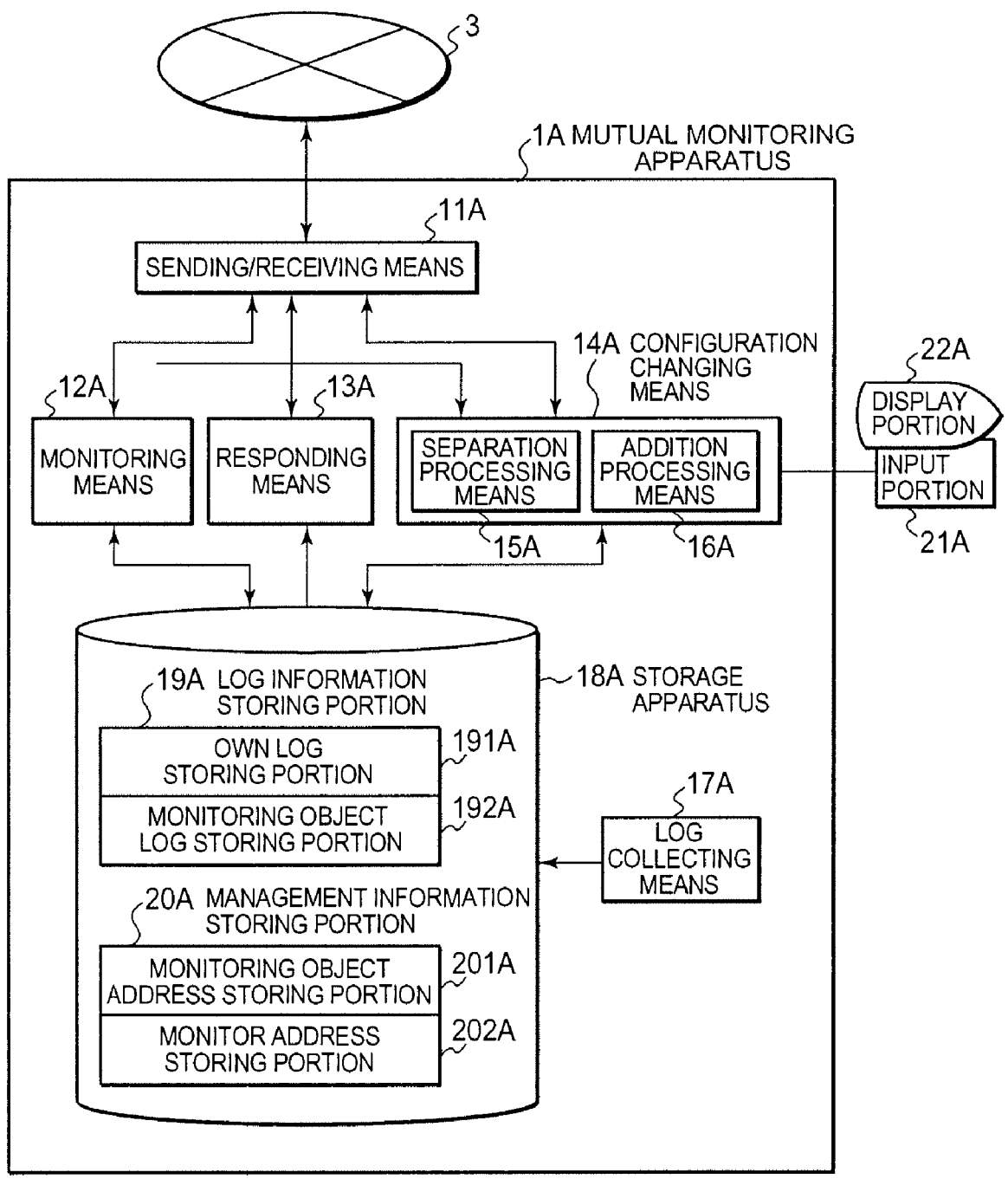
FIG. 2 is a block diagram showing an example of the configuration of a mutual monitoring apparatus 1A.

FIG. 2 is a block diagram showing an example of the configuration of an apparatus 1A. In the example of the configuration, the apparatus 1A comprises sending/receiving means 11A, monitoring means 12A, responding means 13A, configuration changing means 14A, log collecting means 17A, a storage apparatus 18A, an input portion 21A such as a keyboard, and a display portion 22A such as a liquid crystal display (LCD).

The storage apparatus 18A is implemented with magnetic disks, optical disks or the like, and has a log information storing portion 19A and a management information storing portion 20A.

The log information storing portion 19A comprises an own log storing portion 191A in which its own log information of the apparatus 1A is registered, and a monitoring object log storing portion 192A in which log information of the monitoring object apparatus of the apparatus 1A is registered. The monitoring object apparatus of the apparatus 1A is one of the apparatuses in the mutual monitoring system to be monitored for the occurrence of a trouble in that apparatus by the apparatus 1A. The management information storing portion 20A comprises a monitoring object address storing portion 201A in which an identifier, for example an IP address, of the monitoring object apparatus of the apparatus 1A is registered, and a monitor address storing portion 202A in which an identifier, for example an IP address, of the monitor apparatus is registered. The monitor apparatus of the apparatus 1A is one of the apparatuses in the mutual monitoring system to monitor occurrence of a trouble in the apparatus 1A. Under normal circumstances or conditions the monitoring object apparatus and the monitor apparatus of the apparatus 1A are different apparatuses. When trouble occurs in an apparatus and such apparatus is separated from the mutual monitoring system, both can be the same apparatus. In this embodiment, the IP address of the apparatus 1B is stored in the monitoring object address storing portion 201A, and the IP address of the apparatus 1D is stored in the monitor address storing portion 202A.

The log collecting means 17A has a function of collecting log information of its own apparatus 1A at intervals of predetermined time, and additionally registering the collected log information in the own log storing portion 191A. Log information collected by the log collecting means 17A includes, for example, information indicating whether or not the result of detection of various kinds of sensors is abnormal. The sensor can be, for example, a temperature sensor, an earthquake sensor, or a electric voltage sensor.

The sending/receiving means 11A has a function of sending and receiving data through the network 3.

The monitoring means 12A has the following functions.

(1) Function of sending a log acquirement request to the apparatus 1B, which is the monitoring object apparatus of the apparatus 1A, in a predetermined period.

(2) Function of registering log information sent back from the apparatus 1B in response to the log acquirement request in the monitoring object log storing portion 192A.

(3) Function of sending a trouble occurrence notification to the management server 2 and instructing the configuration changing means 14A to start separation processing in any of the following cases:
a) where log information is not sent back from the apparatus 1B when predetermined time elapses after sending the log acquirement request; and
b) where log information sent back indicates that a trouble has occurred in the apparatus 1B.

The responding means 13A has a function of sending to the apparatus 1D the log information of its own apparatus 1A which is registered in the own log storing portion 191A when a log information acquirement request is sent from the apparatus 1D. The apparatus 1D is the monitor apparatus of the apparatus 1A.

The configuration changing means 14A comprises separation processing means 15A for separating from the mutual monitoring system an apparatus in which trouble has occurred, and addition processing means 16A for adding a new apparatus to the mutual monitoring system.

Figure 3:
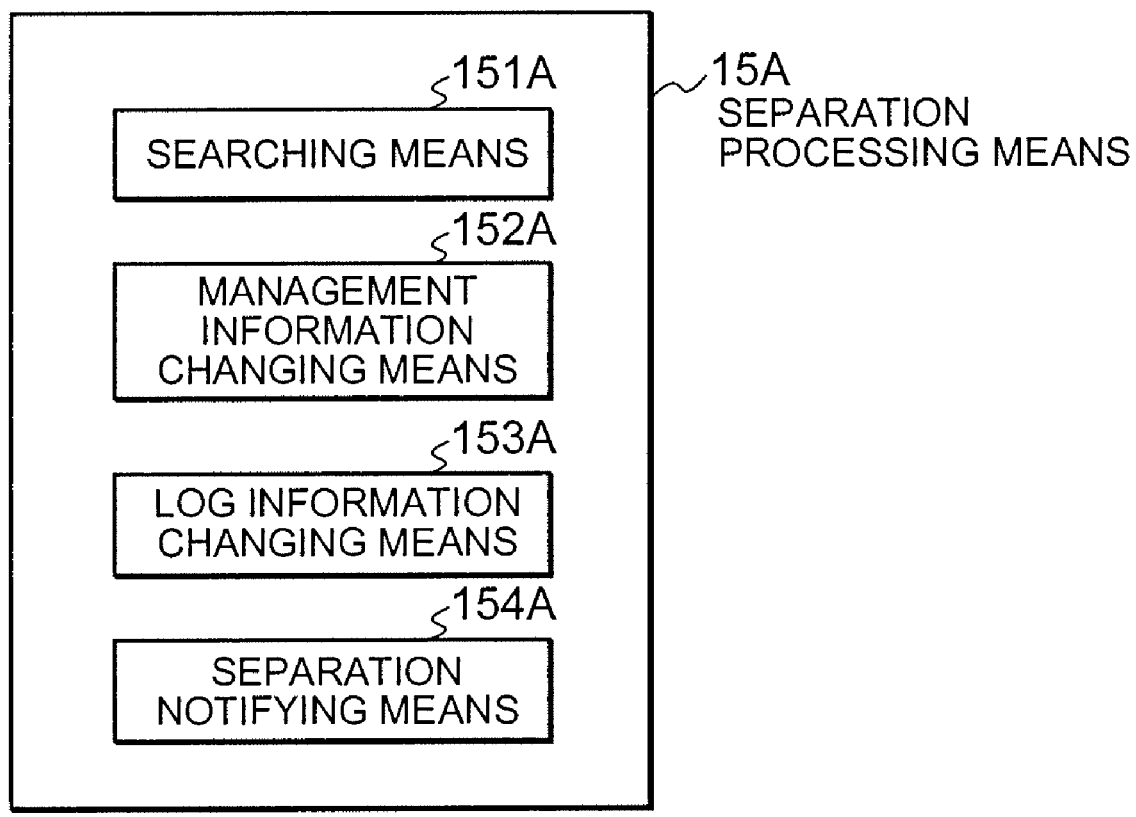
FIG. 3 is a block diagram showing an example of the configuration of separation processing means 15A.

FIG. 3 is a block diagram showing an example of the configuration of the separation processing means 15A, which comprises searching means 151A, management information changing means 152A, log information changing means 153A and separation notifying means 154A.

The searching means searches the search target apparatus, which is the apparatus monitored by the apparatus in which trouble has occurred. For example, when a trouble occurs in the apparatus 1B which is a monitoring object apparatus of the apparatus 1A, the searching means 151A searches the apparatus 1C which has been monitored by the apparatus 1B.

The management information changing means 152A has the following functions.

(1) Function of changing the monitoring object apparatus from the apparatus 1B to the apparatus 1C by changing the IP address of the apparatus 1B registered in the monitoring object address storing portion 201A to the IP address of the apparatus 1C searched out by the searching means 151A.

(2) Function of sending to a new monitoring object apparatus (apparatus 1C) a first address change request for requesting the change of the IP address of the monitor apparatus to the IP address of its own apparatus 1A.

(3) Function of changing the contents of the monitor address storing portion 202A in accordance with the aforementioned request when the first address change request is sent from another apparatus.

The log information changing means 153A has the following functions.

(1) Function of sending log information registered in the monitoring object log storing portion 192A to the management server 2.

(2) Function of sending to a new monitoring object apparatus (apparatus 1C) a first log information request for requesting log information of the apparatus 1C.

(3) Function of registering (overwriting) in the monitoring object log storing portion 192A log information sent from the apparatus IC in response to the first log information request.

(4) Function of sending log information of its own apparatus 1A registered in the own log storing portion 191A to a requester when the first log information request is sent from another apparatus.

The separation notifying means 154A has a function of notifying the management server 2 that the apparatus 1B in which trouble has occurred has been separated.

Figure 4:
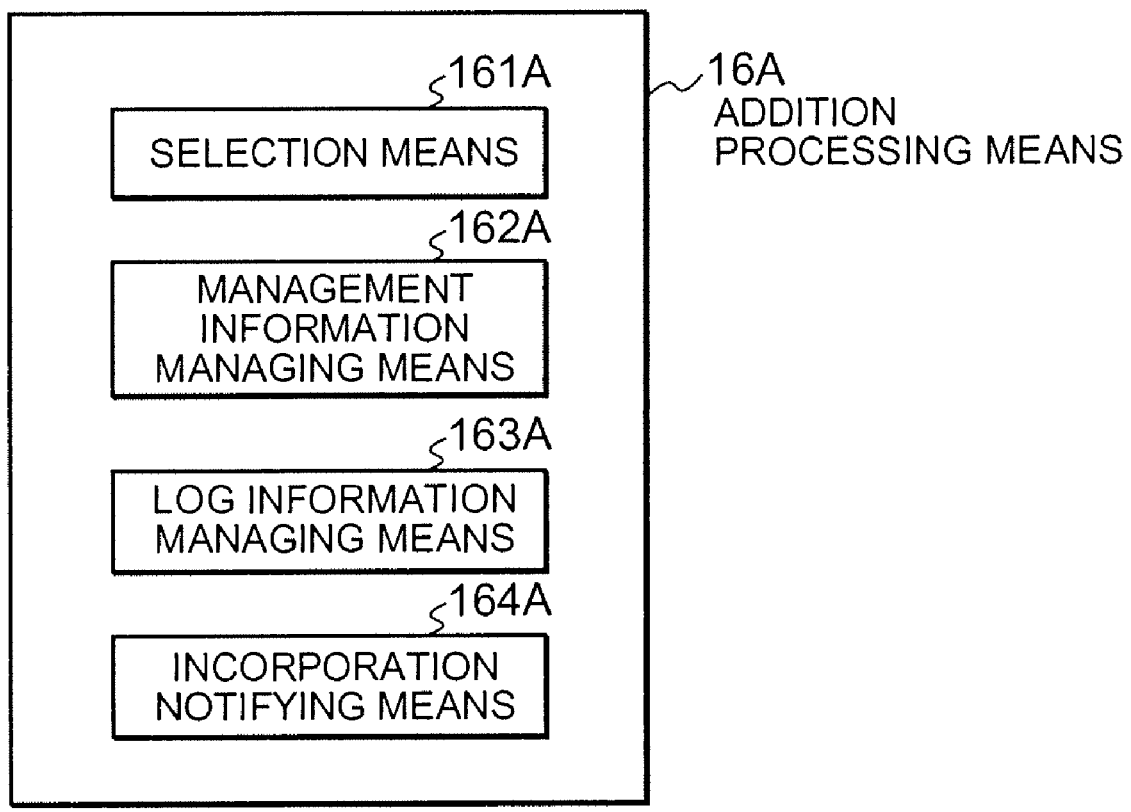
FIG. 4 is a block diagram showing an example of the addition processing means 16A.

FIG. 4 is a block diagram showing an example of the configuration of the addition processing means 16A, which comprises selection means 161A, management information managing means 162A, log information managing means 163A and incorporation notifying means 164A.

The selection means 161A has a function of selecting two apparatuses from the apparatuses constituting the mutual monitoring system. Of the two apparatuses, one is to be the monitoring object apparatus of the apparatus 1A and the other is to be the monitor apparatus of the apparatus 1A when its own apparatus 1A is newly added to the mutual monitoring system.

The management information managing means 162A has the following functions.

(1) Function of registering in the monitoring object address storing portion 201A and the monitor address storing portion 202A the IP addresses of the monitoring object apparatus and the monitor apparatus which have been selected by the selection means 161A, respectively.

(2) Function of sending a second address change request for requesting the change of the IP address of the monitor apparatus to the IP address of its own apparatus 1A to the monitoring object apparatus selected by the selection means 161A.

(3) Function of changing the contents of the monitor address storing portion 202A in accordance with the aforementioned second address change request when the second address change request is sent from another apparatus.

(4) Function of sending a third address change request for requesting the change of the IP address of the monitoring object apparatus to the IP address of its own apparatus 1A to the monitor apparatus selected by the selection means 161A.

(5) Function of changing the contents of the monitoring object address storing portion 201A in accordance with the aforementioned third address change request when the third address change request is sent from another apparatus.

The log information managing means 163A has the following functions.

(1) Function of sending to the monitoring object apparatus selected by the selection means 161A a second log information request for requesting log information of the apparatus.

(2) Function of registering in the monitoring object log storing portion 192A log information sent from the aforementioned monitoring object apparatus in response to the second log information request.

(3) Function of sending log information registered in the own log storing portion 191 to a requester when the second log information request is sent from another apparatus.

The incorporation notifying means 164 has a function of notifying the management server 2 that its own apparatus 1A has been incorporated in the mutual monitoring system.

The apparatus, for example apparatus 1A having these functions can be implemented with a computer and software. It is implemented with a computer in, for example, a manner described below. A disk, semiconductor memory or other recording medium storing a program for making a computer function as the apparatus 1A is prepared, and the computer is made to read the aforementioned program. The computer functions as the sending/receiving means 11A, the monitoring means 12A, the responding means 13A, the configuration changing means 14A and the log collecting means 17A by controlling operations of itself in accordance with instructions in the read program.

Other apparatuses have a configuration similar to that of the apparatus 1A, and can be implemented with a computer and software.

Operations of this embodiment will now be described in detail.

Figure 5A:
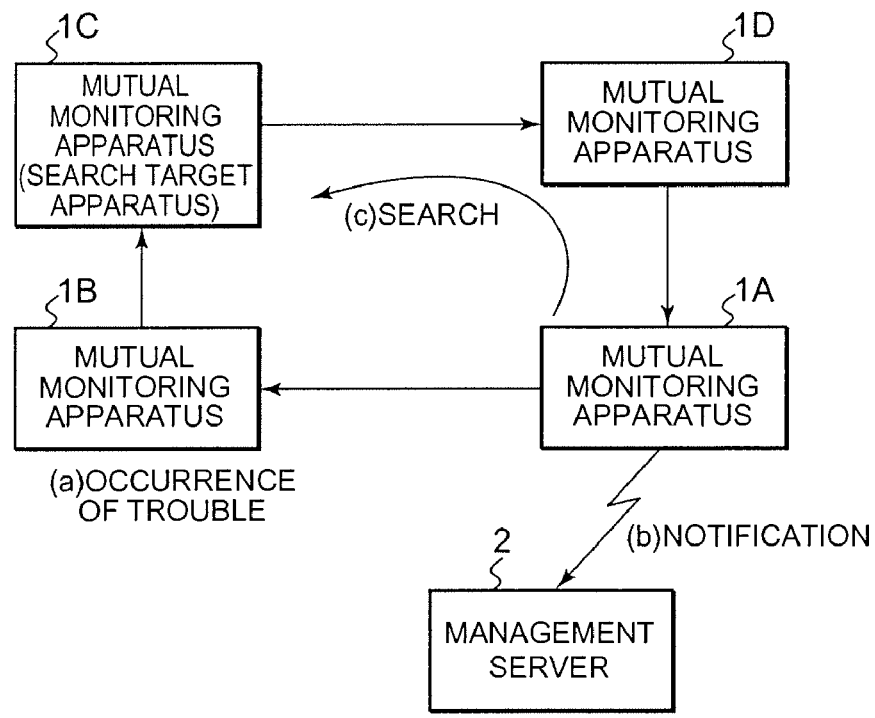
FIGS. 5A and 5B are views for explaining an operation when trouble occurs in a mutual monitoring apparatus 1B.

First, monitoring operations performed in each of the apparatuses 1A to 1D will be described. In the exemplary embodiment, the apparatuses 1A, 1B, 1C and 1D monitor the apparatuses 1B, 1C, 1D and 1A, respectively, as shown in FIG. 5A. In this case, the IP addresses of the apparatuses 1B, 1C, 1D and 1A are registered in the monitoring object address storing portions 201A, 201B, 201C and 201D in the apparatuses 1A, 1B, 1C and 1D, respectively, and the IP addresses of the apparatuses 1D, 1A, 1B and 1C are registered in the monitor address storing portions 202A, 202B, 202C and 202D in the apparatuses 1A, 1B, 1C and 1D, respectively.

Monitoring means 12A to 12D in the apparatuses 1A to 1D perform processing shown in the flowchart of FIG. 6 at intervals of predetermined period. The processing is as follows if explained taking the monitoring means 12A as an example.

The monitoring means 12A first inputs the IP address of the monitoring object apparatus 1B from the monitoring object address storing portion 201A, and sends a log acquirement request to the apparatus 1B identified with the IP address inputted (steps S61 and S62).

Figure 7:
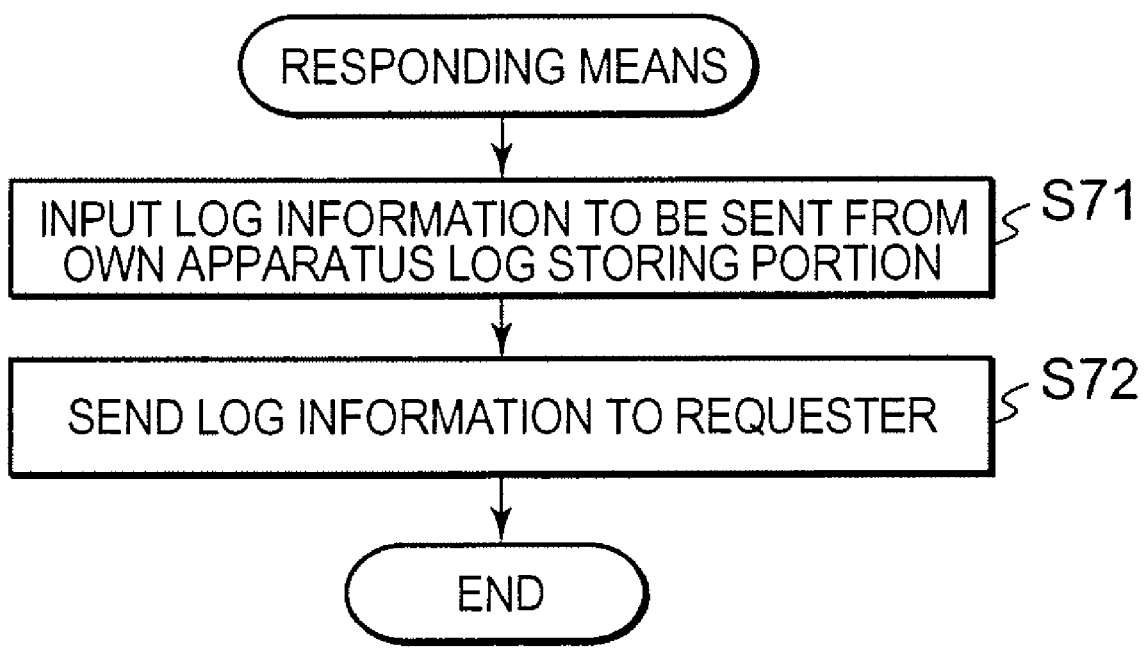
FIG. 7 is a flowchart showing an example of processing by responding means 13B.

When the log acquirement request is sent from the apparatus 1A, the responding means 13B in the apparatus 1B inputs log information to be sent from the own log storing portion 191B, and sends back the log information to the requester which is the apparatus 1A (steps S71 and S72 in FIG. 7). This log information includes information indicating states of various kinds of sensors as described previously.

When receiving log information within a predetermined time after sending the log acquirement request (Yes in step S63 and No in step S64 in FIG. 6), the monitoring means 12A of the apparatus 1A additionally registers the received log information in the monitoring object log storing portion 192A (step S65). Thereafter, it is checked whether or not the log information indicates that a trouble has occurred in the apparatus 1B, and if the log information indicates that no trouble has occurred (No in step S66), the processing is ended. If the log information sent from the apparatus 1B indicates occurrence of a trouble (Yes in step S66), the management server 2 is notified that a trouble has occurred in the apparatus 1B (step S67). Next, the separation processing means 15A is instructed to start processing (step S68). If log information is not received within a predetermined time after the log acquirement request is sent (Yes in step S64), processing of steps S67 and S68 is performed.

Operations when trouble occurs in the apparatus will now be described taking as an example a case where trouble occurs in the apparatus 1B.

When trouble occurs in the apparatus 1B [(a) in FIG. 5A], the monitoring means 12A in the apparatus 1A which monitors the apparatus 1B detects the occurrence of a trouble (Yes in step S64 or step S66 in FIG. 6), and notifies the management server 2 that a trouble has occurred in the apparatus 1B [(b) in FIG. 5A and step S67 in FIG. 6]. Next, the separation processing means 15A is instructed to start processing (step S68).

When instructed to start processing by the monitoring means 12A, the separation processing means 15A first uses the searching means 151A to search an apparatus that has used as a monitor apparatus of the apparatus 1B in which a trouble has occurred [(c) in FIG. 5A]. In this case, the apparatus 1C is searched. In other words, it is the search target apparatus.

Figure 8:
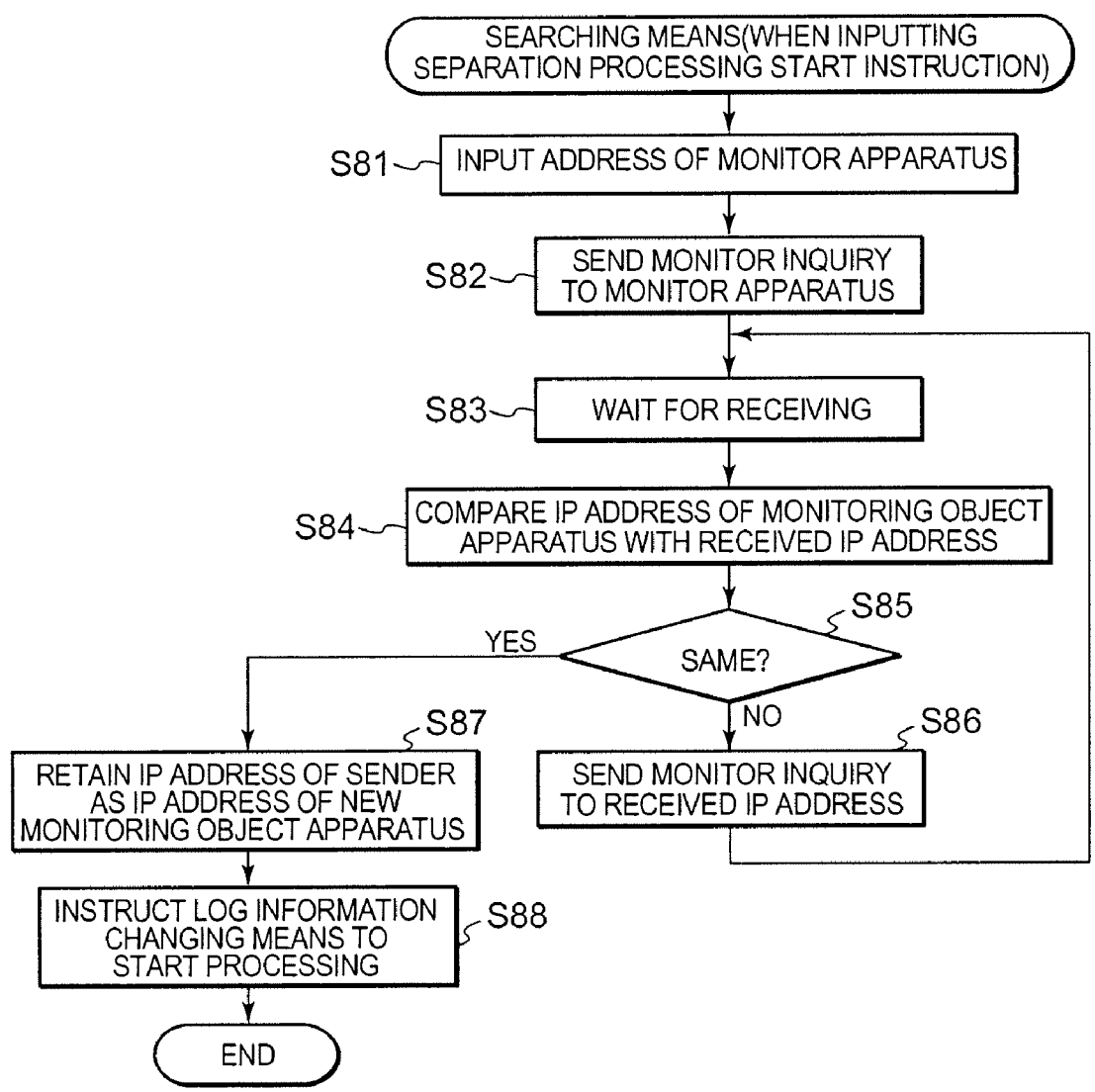
FIG. 8 is a flowchart showing an example of processing by searching means 151A when instructed to start separation processing.

The searching means 151A performs processing shown in, for example, the flowchart of FIG. 8 for searching a search target apparatus, which is, in this case, apparatus 1C.

First, the searching means 151A inputs the IP address of the apparatus 1D from the monitor address storing portion 202A. The apparatus 1D is monitoring the apparatus 1A and it is the monitor apparatus of apparatus 1A. And then the searching means 151A sends an inquiry about the address of the monitor apparatus of the apparatus 1D to the apparatus 1D which is identified with the inputted IP address (steps S81 and S82). Thereafter, the searching means 151A goes into a waiting state of receiving the response from the apparatus 1D (step S83).

Figure 9:
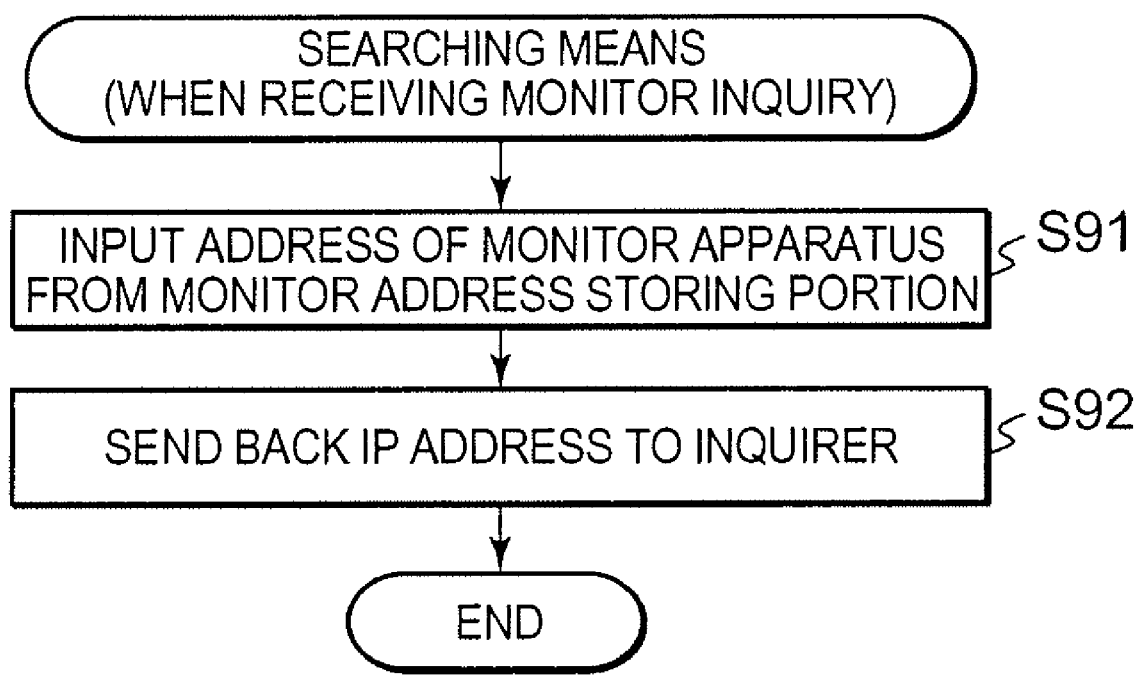
FIG. 9 is a flowchart showing an example of processing by searching means 151D when receiving an inquiry about an address of a monitor.

When the inquiry about the address of the monitor apparatus is sent from the apparatus 1A, searching means 151D in the apparatus 1D inputs the IP address of the apparatus 1C monitoring its own apparatus 1D from a monitor address storing portion 202D in its own apparatus 1D, and sends back the IP address to the inquirer, that is to the apparatus 1A (steps S91 and S92) as shown in the flowchart of FIG. 9.

When receiving the IP address of the apparatus 1C sent from the apparatus 1D (step S83 in FIG. 8), the searching means 151A of an inquirer (apparatus 1A) compares the received IP address with the IP address registered in the monitoring object address storing portion 201A (IP address of the apparatus 1B which is monitored by its own apparatus 1A) (step S84). In this example, the result of comparison shows that the former is different with the latter (No in step S85), and therefore the searching means 151A sends an inquiry about the address of the monitor apparatus of the apparatus 1C to the apparatus 1C based on the received IP address (step S86).

When the inquiry about the address of the monitor apparatus is sent from the apparatus 1A, searching means 151C in the apparatus 1C inputs from a monitor address storing portion 202C the IP address of the apparatus 1B by which its own apparatus 1C is monitored, and sends back the IP address to the inquirer, which is the apparatus 1A (steps S91 and S92 in FIG. 9).

Since the IP address of the apparatus 1B received this time is same with the IP address of the apparatus 1B as the monitoring object apparatus of its own apparatus, registered in the monitoring object address storing portion 201A (Yes in step S85), the searching means 151A in the apparatus 1A retains therein the IP address of the sender (the apparatus 1C) as the IP address of a search target apparatus, which is to be a new monitoring object apparatus, and then instructs the log information changing means 153A to start processing (steps S87 and S88).

Figure 5B:
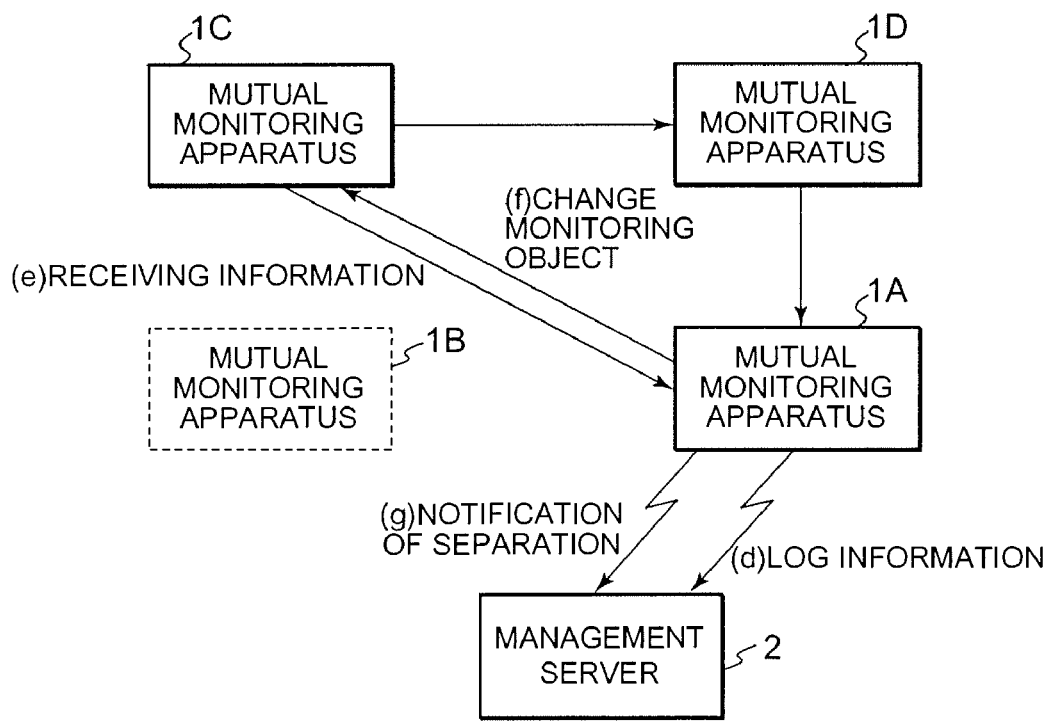
Figure 10:
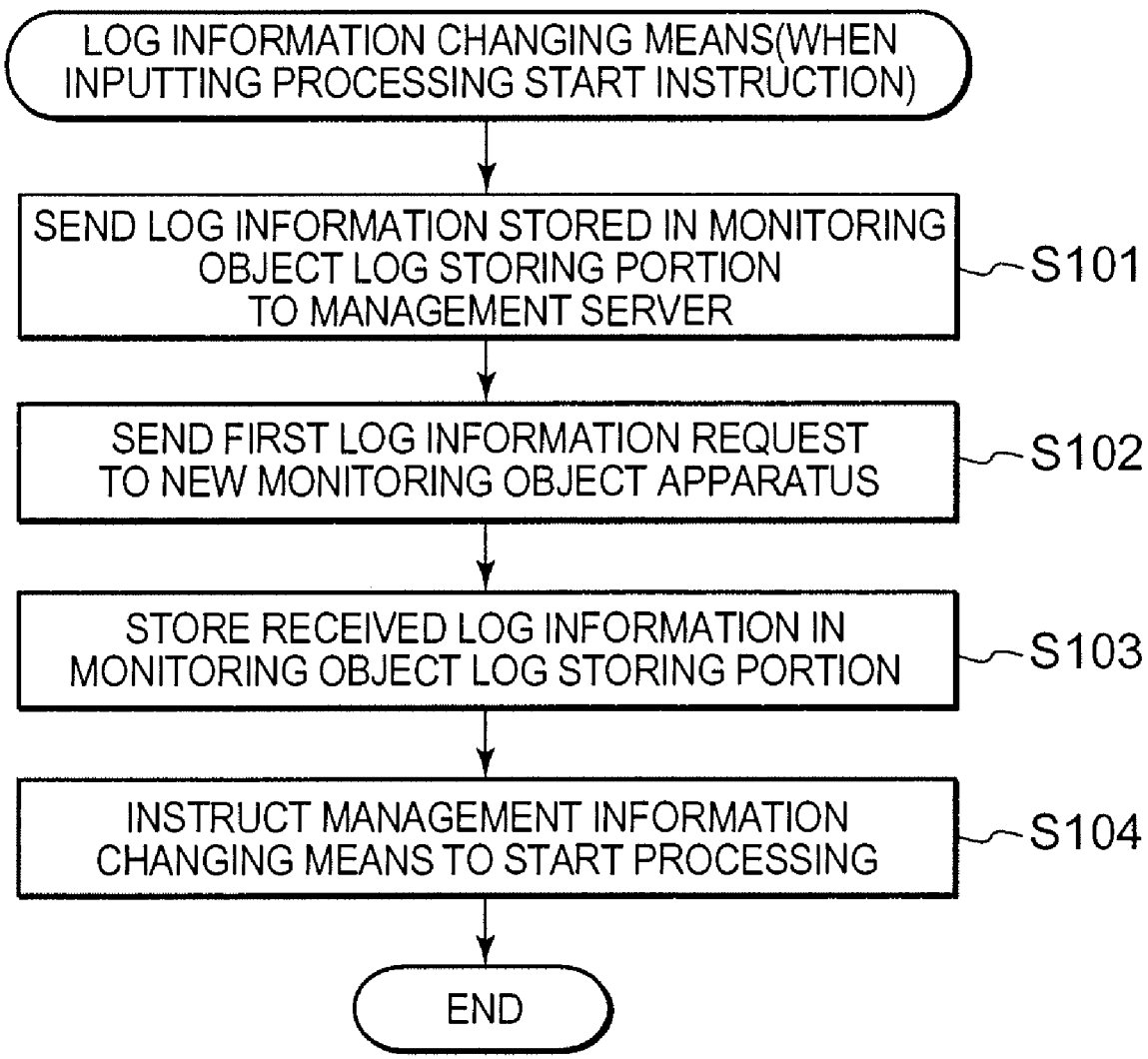
FIG. 10 is a flowchart showing an example of processing by log information changing means 153A when instructed to start processing.

When instructed to start processing, the log information changing means 153A sends log information registered in the monitoring object log storing portion 192A (which is the log information of the apparatus 1B) to the management server 2 [(d) in FIG. 5B and step S101 in FIG. 10]. Thereafter, the log information changing means 153A sends a first log information request to the apparatus 1C as a new monitoring object apparatus, and goes into a waiting state for receiving the response (step S102).

Figure 11:
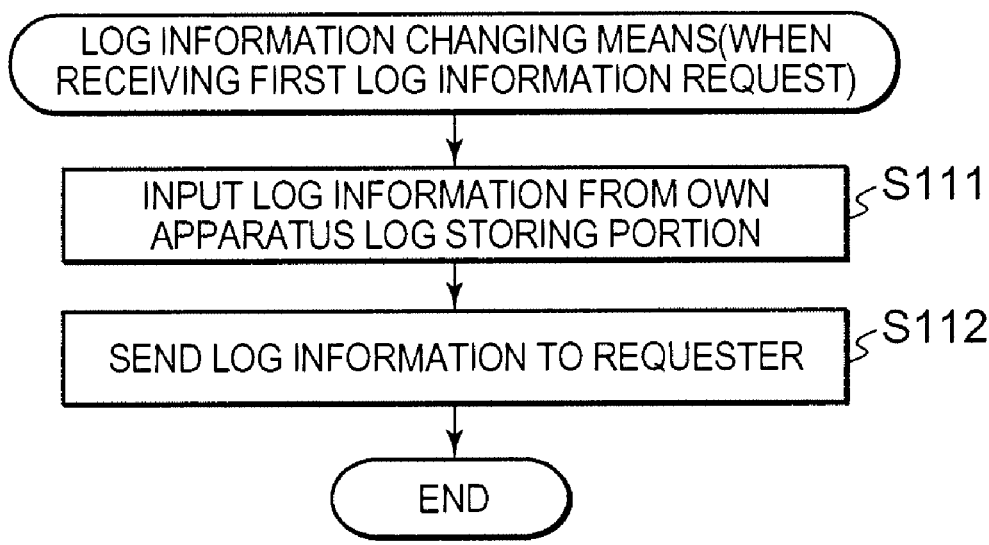
FIG. 11 is a flowchart showing an example of processing by log information changing means 153C when receiving a first log information request.

When receiving the first log information request from the apparatus 1A, log information changing means 153C in the apparatus 1C inputs log information of its own apparatus 1C from the own log storing portion 191C, and sends back that log information to the requester, that is the apparatus 1A [steps S111 and S112 in FIG. 11 and (e) in FIG. 5B].

When log information is sent from the apparatus 1C as the new monitoring object apparatus, the log information changing means 153A in the apparatus 1A registers the log information in the monitoring object log storing portion 192A, and then instructs the management information changing means 152A to start processing (steps S103 and S104 in FIG. 10).

Figure 12:
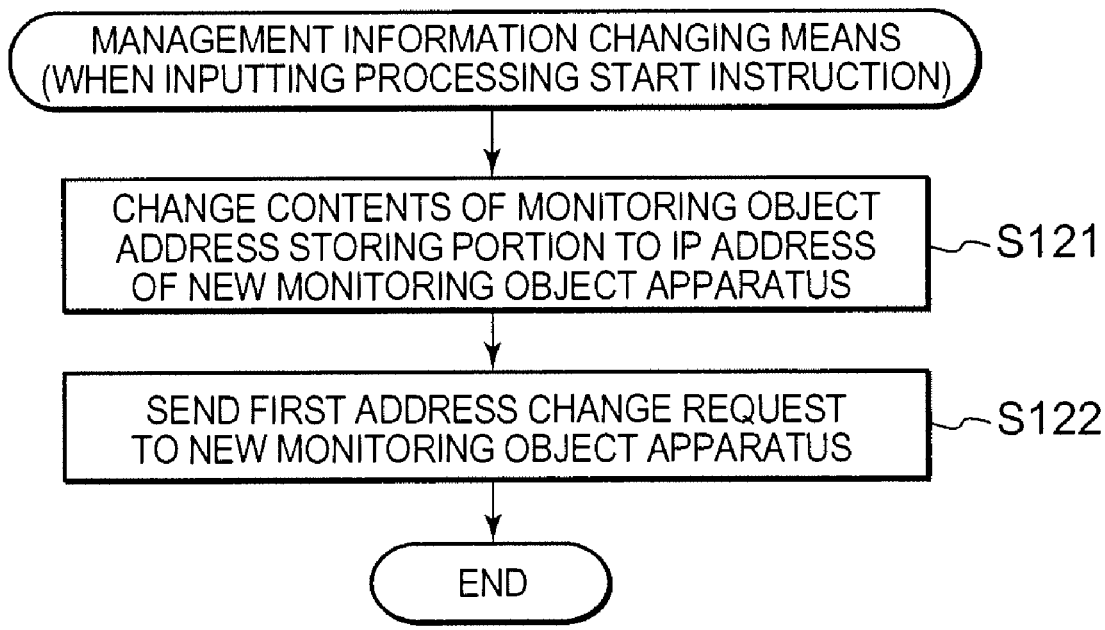
FIG. 12 is a flowchart showing an example of processing by management information changing means 152A when instructed to start processing.

When instructed to start processing, the management information changing means 152A replaces the IP address of the apparatus 1B registered in the monitoring object address storing portion 201A with the IP address of the apparatus 1C as the new monitoring object apparatus (step S121 in FIG. 12). Thereafter, the management information changing means 152A sends a first address change request including the IP address of its own apparatus 1A to the apparatus 1C as the new monitoring object apparatus [step S122 and (f) in FIG. 5B], and ends processing.

Figure 13:
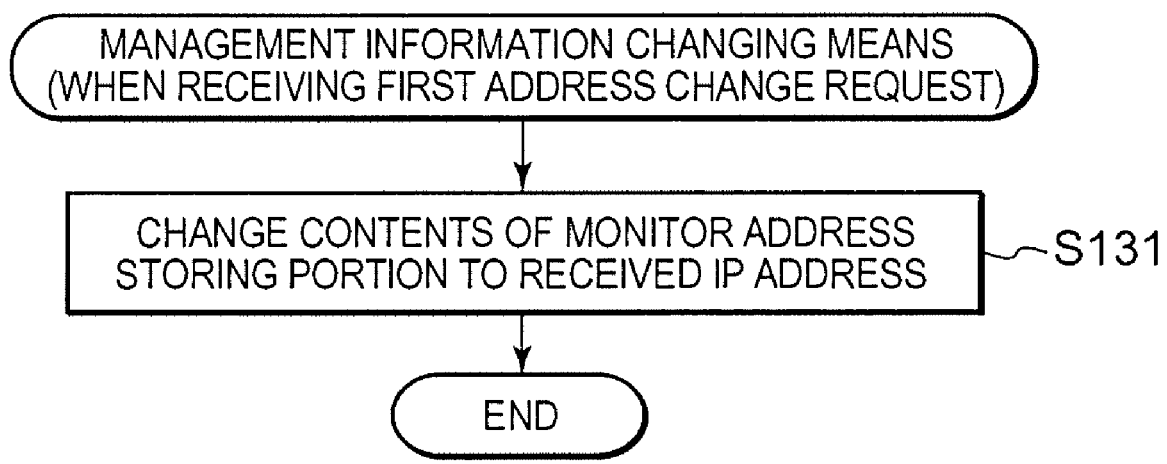
FIG. 13 is a flowchart showing an example of processing by management information changing means 152C when receiving a first address change request.

When receiving the first address change request, the management information changing means 152C in the apparatus 1C replaces the IP address of the apparatus 1B stored in the monitor address storing portion 202C with the IP address of the new monitor apparatus (the apparatus 1A) included in the first address change request (step S131) as shown in the flowchart of FIG. 13.

When processing by the management information changing means 152A is ended, the separation means 154A in the apparatus 1A sends to the management server 2 a separation notification indicating that the apparatus 1B has been separated from the mutual monitoring system[(g) in FIG. 5B]. Thereafter, the apparatus 1A will monitor the apparatus 1C as the monitoring object apparatus instead of the apparatus 1B in which trouble had occurred. When the apparatus 1B recovers, it is incorporated into the mutual monitoring system according to the processes for incorporating a new apparatus as described below.

Operations for incorporating a new apparatus, or a recovered apparatus, in the mutual monitoring system will now be described. The operations will be described taking as an example a case where a new apparatus 1E is incorporated in the mutual monitoring system as shown in FIGS. 14A and 14B.

When the apparatus 1E is to be incorporated in the mutual monitoring system, a manager of the apparatus 1E inputs an addition processing start instruction from an input portion 21E.

Figure 14A:
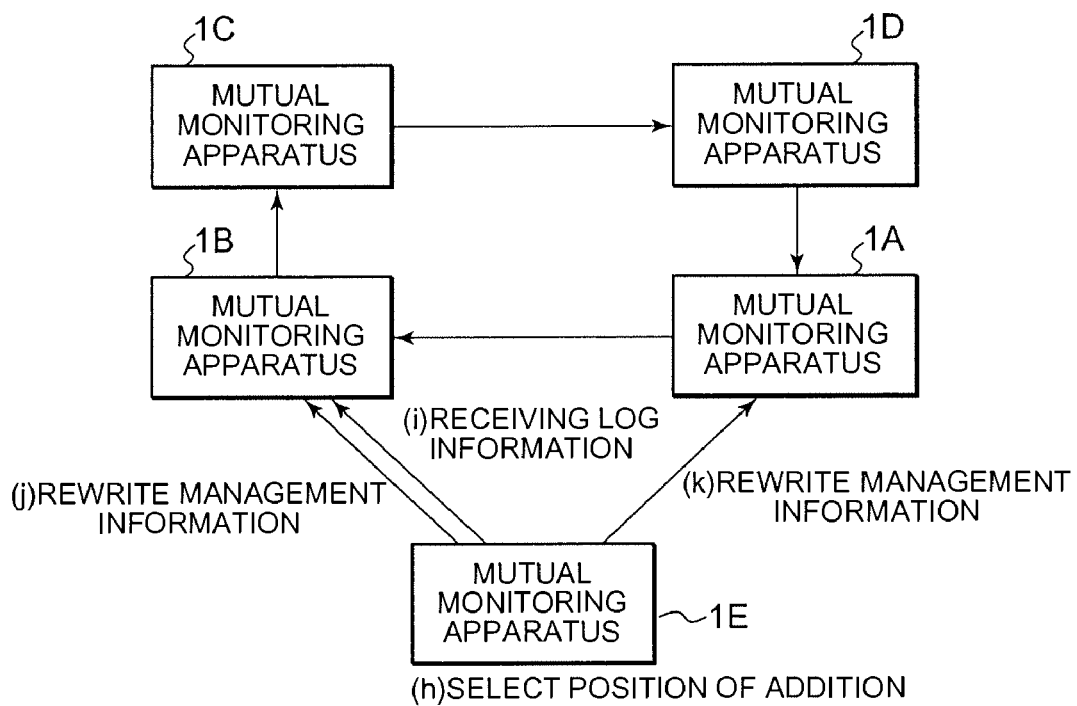
FIGS. 14A and 14B are views for explaining an operation when adding a mutual monitoring apparatus 1E to the mutual monitoring system.
Figure 14B:
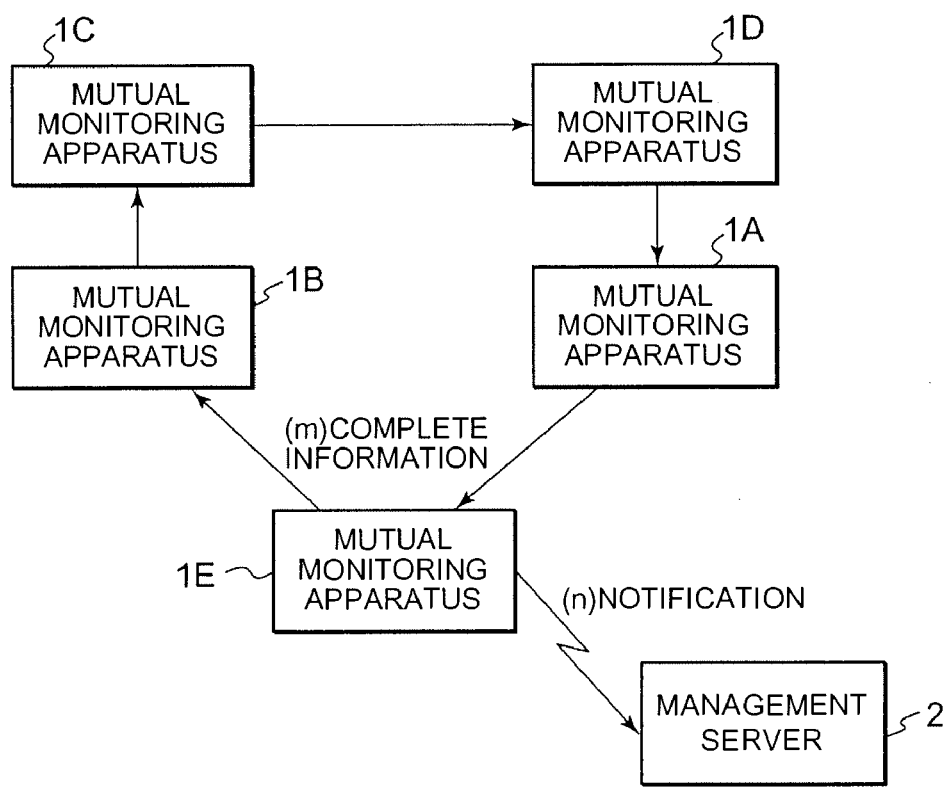

When the addition processing start instruction is inputted from the input portion 21E, the addition processing means 16E in the apparatus 1E selects a position in which the apparatus 1E is to be added using selection means 161E [(h) in FIG. 14A].

Figure 15:
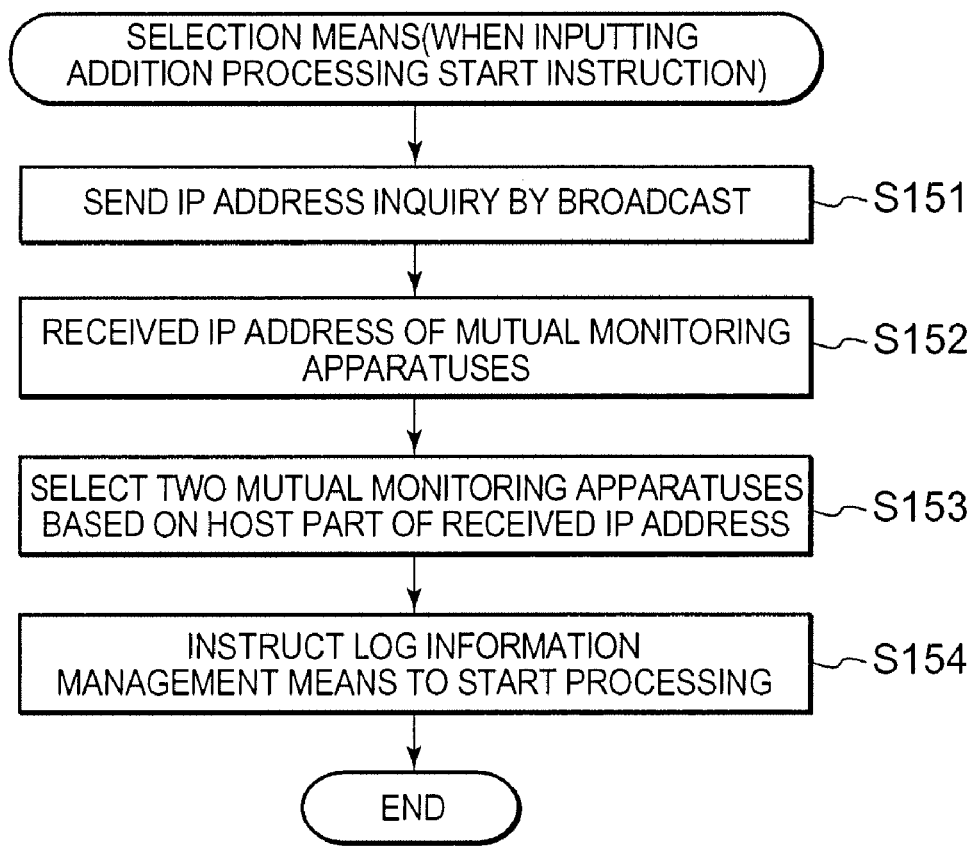
FIG. 15 is a flowchart showing an example of processing by selection means 161E when instructed to start addition processing.

The selection means 161E performs processing shown in, for example, the flowchart of FIG. 15.

First, the selection means 161E sends an IP address inquiry by broadcast to inquire of the apparatuses 1A to 1D constituting the mutual monitoring system about their IP addresses (step S151). Thereafter, the selection means 161E goes into a waiting state for receiving the response (step S152).

Figure 16:
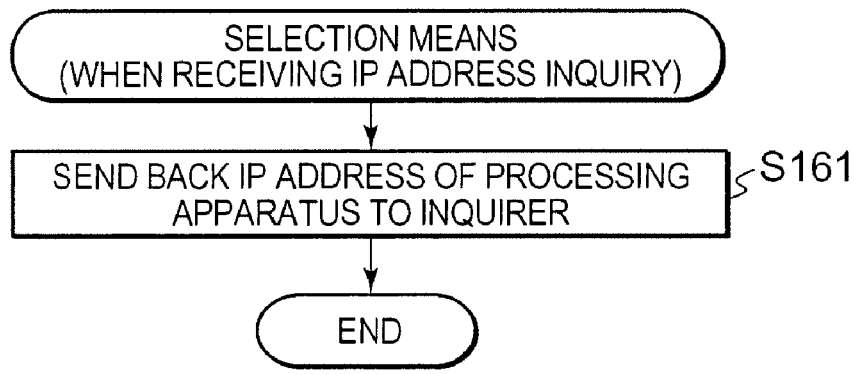
FIG. 16 is a flowchart showing an example of processing by selection means 161A, 161B, 161C and 161D when receiving an IP address inquiry.

When receiving the IP address inquiry from the apparatus 1E, selection means 161A to 161D in the apparatuses 1A to 1D send back the IP addresses of its own apparatuses 1A to 1D to the apparatus 1E of the inquirer (step S161 in FIG. 16).

The selection means 161E in the inquirer, which is the apparatus 1E, waits until a predetermined time (time sufficient for acquiring the IP addresses from all apparatuses 1A to 1D constituting the mutual monitoring system) elapses after sending the IP address inquiry. Thereafter, the selection means 161E selects the monitoring object apparatus and the monitor apparatus for the apparatus 1E from the received IP addresses of apparatuses 1A to 1D. The two addresses are those of two apparatuses of which one is going to be the monitor apparatus of the apparatus 1E, monitors the other, and which one is to be the monitoring object apparatus of the apparatus 1E. For example, two IP addresses of which the host part (host address) is closest to the host part of the IP address of its own apparatus E are selected, the apparatus indicated by one IP address (e.g. higher address) is selected as an apparatus to be monitored by the apparatus 1E (monitoring object apparatus for apparatus 1E), and the apparatus indicated by the other IP address is selected as an apparatus to monitor the apparatus 1E (monitor apparatus for the apparatus 1E) (step S153 in FIG. 15). In this example, the apparatuses 1B and 1A are selected as a monitoring object apparatus and a monitor apparatus, respectively.

Thereafter, the selection means 161E instructs log information managing means 163E to start processing (step S154).

Figure 17:
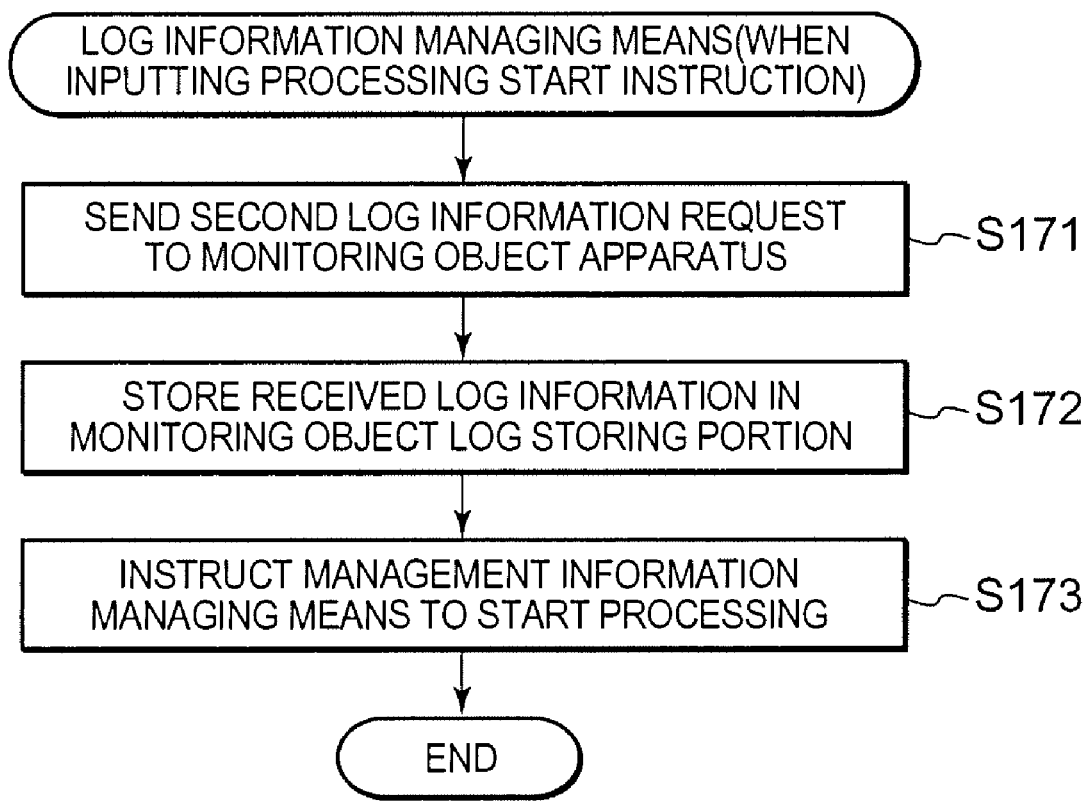
FIG. 17 is a flowchart showing an example of processing by log information managing means 163E when instructed to start processing.

When instructed to start processing, the log information managing means 163E sends a second log information request to the apparatus 1B as the monitoring object apparatus, and goes into a response waiting state (step S171 in FIG. 17).

Figure 18:
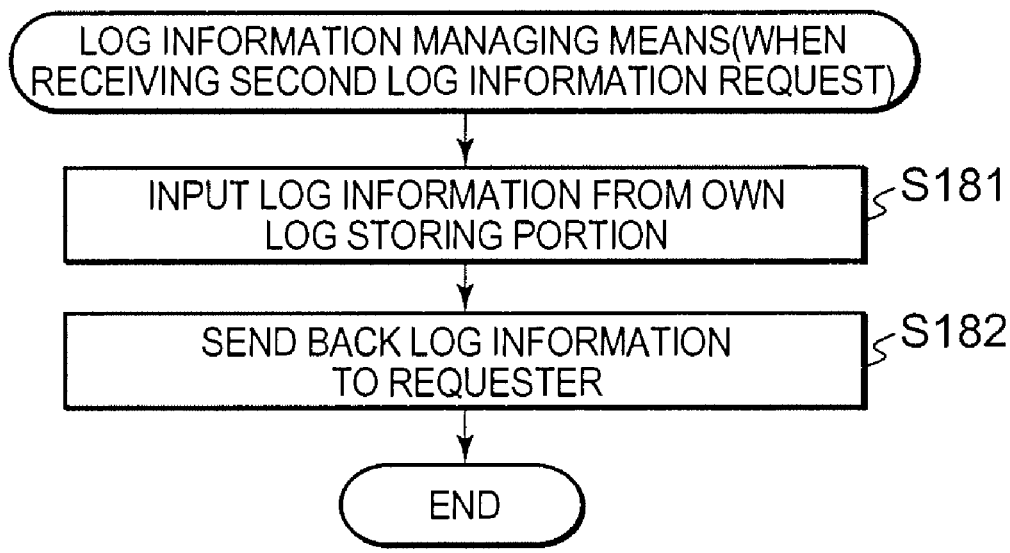
FIG. 18 is a flowchart showing an example of processing by log information managing means 163B when receiving a second log information request.

When receiving the second log information request, the log information managing means 163B in the apparatus 1B inputs log information from the own log storing portion 191B, and sends back the log information to the log information managing means 163E of a requester, which is the apparatus 1E [steps S181 and S182 in FIG. 18 and (i) in FIG. 14A].

The log information managing means 163E of a requester registers in the monitoring object log storing portion 192E the log information sent from the apparatus 1B as the monitoring object apparatus (step S172 in FIG. 17), and then instructs the management information managing means 162E to start processing (step S173).

Figure 19:
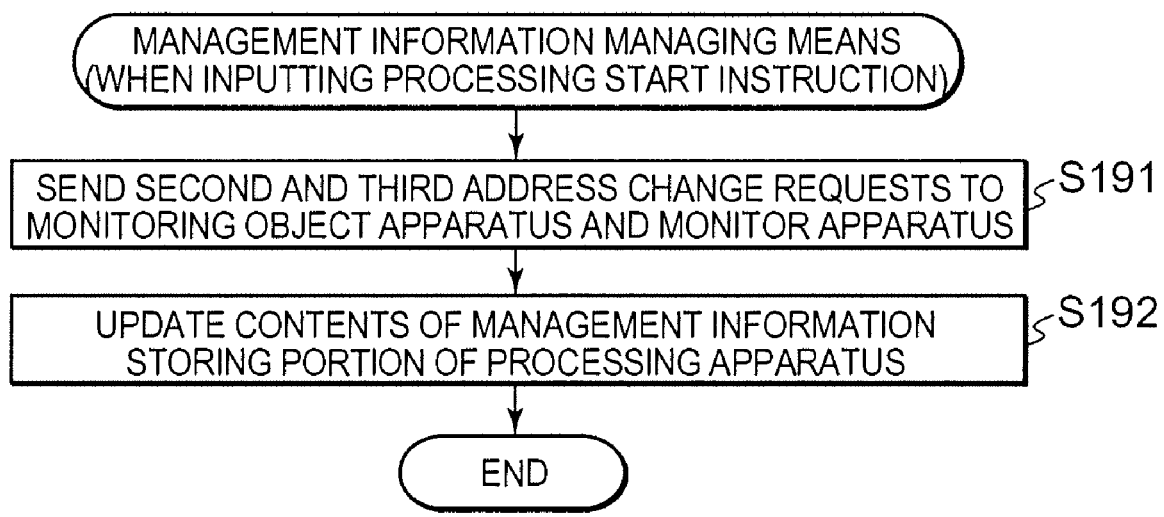
FIG. 19 is a flowchart showing an example of processing by management information managing means 162E when instructed to start processing.

When instructed to start processing, the management information managing means 162E sends second and third address change requests to the apparatus 1B as the monitoring object apparatus and the apparatus 1A as the monitor apparatus, respectively (step S191), then stores the IP address of the apparatus 1B as the monitoring object apparatus in the monitoring object address storing portion 201E, stores the IP address of the apparatus 1A as the monitor apparatus in the monitor address storing portion 202E (step S192), and ends processing as shown in the flowchart of FIG. 19. The second and third address change requests include the IP address of the apparatus 1E.

Figure 20:
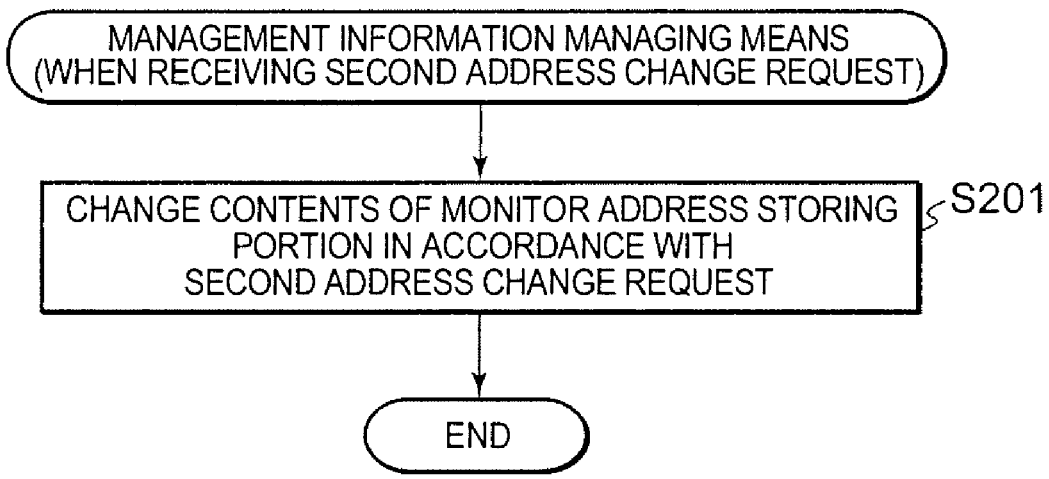
FIG. 20 is a flowchart showing an example of processing by management information managing means 162B when receiving a second address change request.
Figure 21:
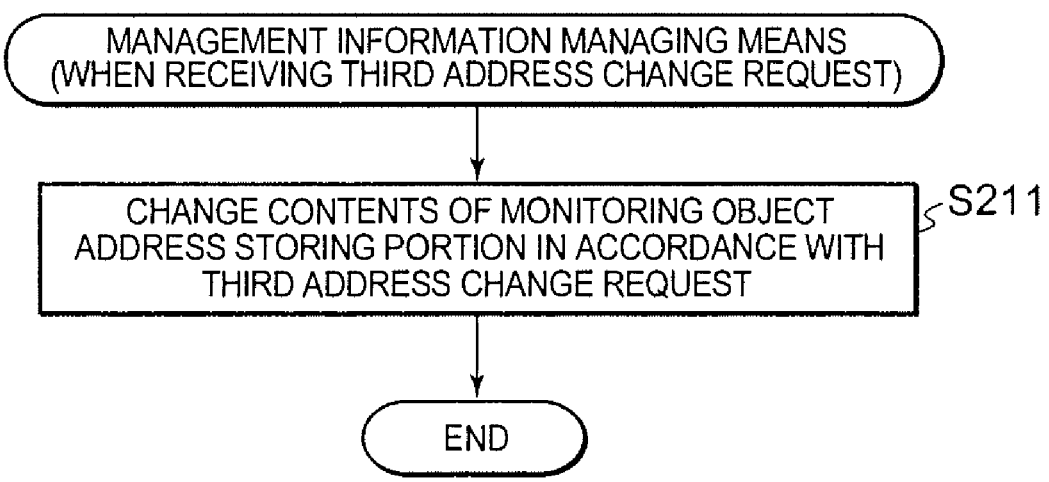
FIG. 21 is a flowchart showing an example of processing by management information managing means 162A when receiving a third address change request.

When receiving the second address change request, the management information managing means 162B in the apparatus 1B rewrites the contents of the monitor address storing portion 202B with the IP address of the apparatus 1E included in the aforementioned request [step S201 in FIG. 20 and (j) in FIG. 14A]. When receiving the third address change request, the management information managing means 162A in the apparatus 1A rewrites the contents of the monitoring object address storing portion 201A with the IP address of the apparatus 1E included in the aforementioned request [step S211 in FIG. 21 and (k) in FIG. 14A]. By the above processing, the apparatus 1E is incorporated in the mutual monitoring system [(m) in FIG. 14B], and incorporation notifying means 164E then notifies the management server 2 that the apparatus 1E has been incorporated in the mutual monitoring system. This notification includes, for example, the IP address of the incorporated apparatus 1E, the IP address of the apparatus 1B as the monitoring object apparatus of the apparatus 1E, and the IP address of the apparatus 1A as the monitor apparatus of the apparatus 1E.

In the explanations described above, the searching means searches for a new monitoring object apparatus by unicast if a trouble occurs in an apparatus, but the searching means may search by broadcast. In this case, the searching means 151 performs processing shown in the flowchart of FIG. 22 instead of processing shown in the flowchart of FIG. 8. In the explanations described below, the mutual monitoring system is comprised of apparatuses 1A to 1D as shown in FIG. 5A, and trouble occurs in the apparatus 1B.

Figure 22:
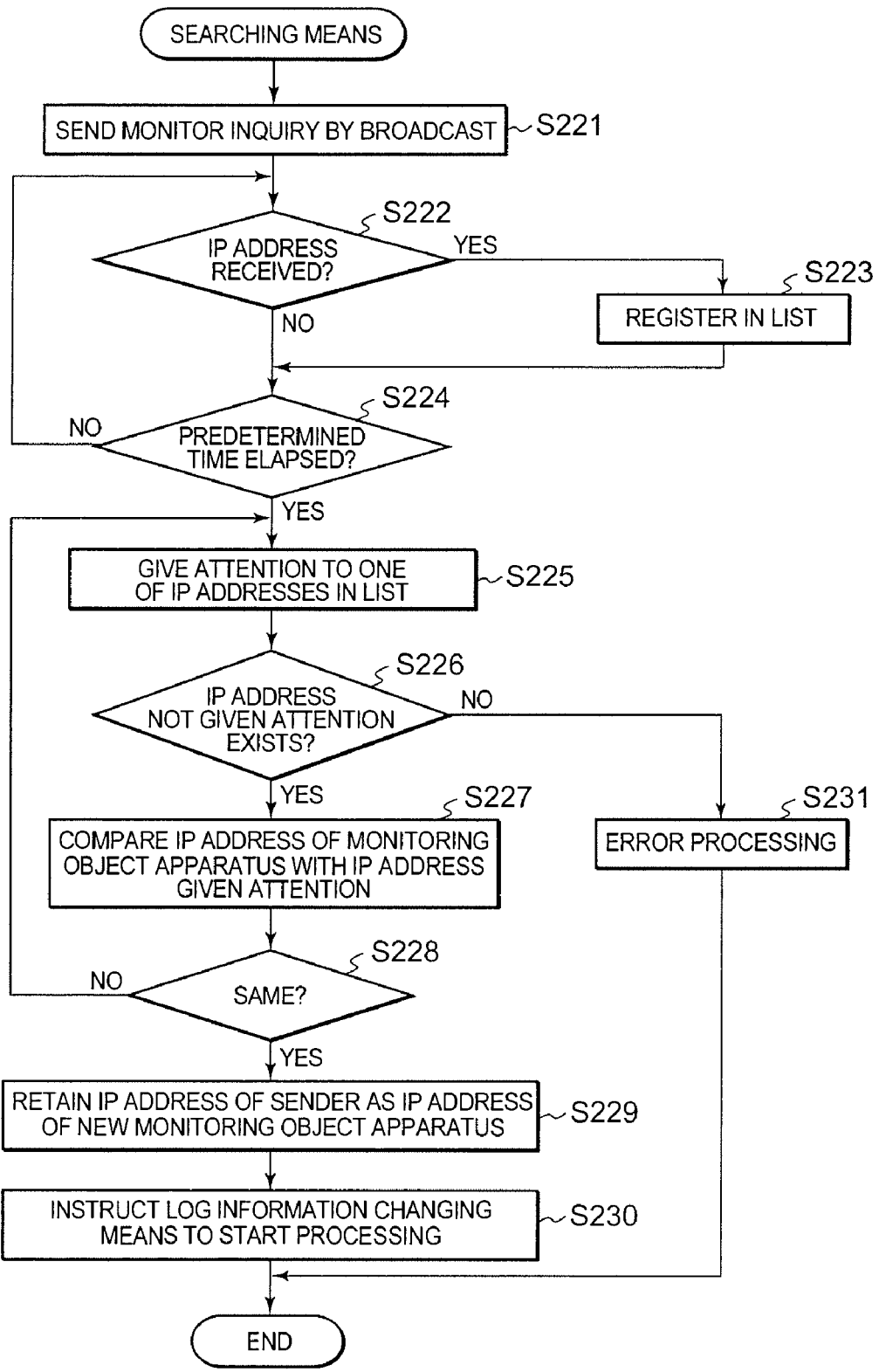
FIG. 22 is a flowchart showing an example of processing by searching means 151A when searching a new monitoring object apparatus by broadcast.

Referring to FIGS. 22 and 5A and 5B, the searching means 151A first sends an inquiry about the address of a monitor apparatus to each of the apparatuses constituting the mutual monitoring system by broadcast (step S221). This broadcast may be done by passing the inquiry through the apparatuses in the system following the monitoring object address and monitor address in each apparatus.

Searching means 151C and 151D in the apparatuses 1C and 1D which operate in normal condition input the IP addresses of the apparatuses 1B and 1C as the monitor apparatuses from the monitor address storing portions 202C and 202D in its own apparatuses 1C and 1D, respectively, and send back the IP addresses to the requester, which is the apparatus 1A (steps S91 and S92 in FIG. 9).

The searching means 151A resisters the IP address of the monitor apparatus in a list (not shown) each time it receives the IP address (Yes in step S222 in FIG. 22, step S223). At this time, the IP address of the sender is registered at the same time.

When a predetermined time elapses after sending the inquiry about a monitoring object (Yes in step S224), the searching means 151A gives attention to one of the IP addresses of the monitor apparatuses registered in the list, and compares this IP address with the IP address of the apparatus 1B which is the monitoring object apparatus by its own apparatus 1A (step S225, Yes in step S226, and step S227).

If the former is different from the latter (No in step S228), processing returns to processing of step S225. If the former is same as the latter (Yes in step S228), the IP address of an apparatus from which the IP address given attention is sent back and is retained inside as the IP address of an apparatus that is a new monitoring object apparatus (step S229), and the log information changing means 153A is then instructed to start processing (step S230). Subsequent processing is as described previously. If none of the IP addresses of the monitor apparatuses registered in the list is same as the IP address of the apparatus 1B, which its own apparatus 1A monitors as the monitoring object apparatus (No in step S226), the searching means displays the fact on a display portion 22A as an error in processing (step S231), and the processing is ended.

What is claimed is:

1. A monitoring system comprising a plurality of apparatuses connected to a network, wherein each apparatus in said plurality of apparatuses exclusively, monitors for an occurrence of trouble in a single monitoring object apparatus, which is one of the other apparatuses of the plurality of apparatuses, and is exclusively monitored by a single monitor apparatus, which is another one of the other apparatuses in the plurality of apparatuses, and wherein each of said plurality of apparatuses comprises: a storage apparatus including a management information storing portion in which a monitoring object identifier and a monitor identifier are registered: a monitoring unit that monitors for an occurrence of trouble in said monitoring object apparatus indicated by said monitoring object identifier; a responding unit that responds to the monitor apparatus indicated by said monitor identifier; and a separation processing unit comprising a searching unit that searches, when the monitoring unit detects an occurrence of trouble in the monitor object apparatus, for a search target apparatus, which is the apparatus monitored by the monitor object apparatus in said plurality of apparatuses in said system, said searching unit includes means for searching for said search target apparatus by requesting other apparatuses in said plurality of apparatuses in said system to send back an identifier of the monitor object apparatus of each apparatus of the plurality of apparatuses in the system, and a management information changing unit that makes the search target apparatus as a new monitor object apparatus by changing said monitoring object identifier registered in said storage apparatus to an identifier of said search target apparatus, and changing said monitor identifier registered in storage apparatus of said search target apparatus to an identifier of said apparatus.

2. The system according to claim 1, wherein the searching unit of each of said plurality of apparatuses connected in the network includes means for requesting a monitor identifier, requests for a monitor identifier being performed sequentially beginning with said monitor apparatus of said apparatus and then is sequentially made to monitor apparatuses of succeeding apparatuses in said plurality of apparatuses until an apparatus sends back a monitor identifier which indicates said the monitoring object apparatus of said apparatus ha response to a request.

3. The system according to claim 1, wherein said searching unit of each of said plurality of apparatuses connected to the network includes means for searching for said search target apparatus by requesting by broadcast other apparatuses of said plurality of apparatuses in said system to send back an identifier of a monitor apparatus of each apparatus of said plurality of apparatuses.

4. The system according to claim 1, wherein 1) each apparatus in said plurality of apparatuses further comprises a log information storing portion of said storage apparatus in which log information of said monitoring object apparatus is registered, and a log collecting unit that collects log information of said apparatus, and 2) said responding unit sends back said log information of said apparatus collected by said log collecting unit to said monitor apparatus in response to a log acquirement request from said monitor apparatus, and 3) said monitoring unit sends said log acquirement requests to said monitoring object apparatus and registers said log information sent back in said log information storing portion, and if said log information is not sent back, determines that trouble has occurred in said monitoring object apparatus, and 4) said separation processing unit of said apparatus further comprises a log information updating unit that updates said log information registered in said log information storing portion with said log information received from said monitoring object apparatus.

5. The system according to claim 1, wherein each apparatus of said plurality of apparatuses further comprises an addition processing unit comprising:
  a selection unit that selects a first apparatus and a second apparatus from said plurality of apparatuses in said system; and
  a management information managing Unit that registers an identifier of said apparatus of said plurality of apparatuses as a monitor identifier of said first apparatus and as a monitoring object identifier of said second apparatus, and that registers an identifier of said first apparatus as said monitoring object identifier of said apparatus of said plurality of apparatuses, and registers an identifier of said second apparatus as said monitor identifier of said apparatus of said plurality of apparatuses.

6. An apparatus for use in a system comprising a plurality of said apparatuses connected to a network, wherein each apparatus in said plurality of apparatuses exclusively monitors for an occurrence of trouble in a single monitoring object apparatus, which is one of the other apparatuses of the plurality of apparatuses, and is exclusively monitored by a single monitor apparatus, which is another one of the other apparatuses in the plurality of apparatuses, said comprising: a storage apparatus including management information storing portion in which a monitoring object identifier and a monitor identifier are registered; a monitoring unit that monitors said monitoring object apparatus indicated by said monitoring object identifier; and a responding unit that responds to said monitor apparatus indicated by said monitor identifier; and a separation processing unit comprising:
  a searching unit that searches, when the monitoring unit detects an occurrence of trouble in the monitor object apparatus, for a search target apparatus, which is the apparatus monitored by the monitor object apparatus in said plurality of apparatuses in said system, wherein said searching unit includes
  means for searching for said target apparatus by requesting other apparatuses in said plurality of apparatuses in said system to send back an identifier of the monitor object apparatus of each apparatus in said plurality of apparatuses, and
  means for determining said search target apparatus to be responding apparatus which sends back an identifier which indicates the monitoring object apparatus of said apparatus; and
  a management information changing unit that makes the search target apparatus as a new monitor object apparatus by changing said monitoring object identifier registered in said apparatus to an identifier of said search target apparatus, and changing said monitor identifier registered in storage apparatus of said search target apparatus to an identifier of said apparatus.

7. The apparatus according to claim 6, wherein the searching unit of each of said plurality of apparatuses connected in the network includes means for requesting a monitor identifier, requests for a monitor identifier being performed sequentially and begins beginning with said monitor apparatus of said apparatus and then is sequentially made to raid monitor apparatus apparatuses of succeeding apparatuses in said plurality of apparatuses until all apparatus sends back raid a monitor identifier which indicates the monitoring object apparatus of said apparatus in response to a request.

8. The apparatus according to claim 6, wherein said searching unit of each of said plurality of apparatuses connected to the network includes means for searching searches for said search target apparatus by requesting by broadcast other apparatuses of said plurality of apparatuses in said system to send back an identifier of a monitor apparatus of each apparatus of said plurality of apparatuses.

9. The apparatus according to claim 6, further comprising: 1) a log information storing portion of said storage apparatus in which log information of said monitoring object apparatus is registered; and a log collecting unit that collects log information of said apparatus, and wherein 2) said responding unit sends back said log information of said apparatus collected by said log collecting unit to said monitor apparatus in response to a log acquirement request from said monitor apparatus, and 3) said monitoring unit sends said log acquirement requests to said monitoring object apparatus and registers said log information sent back in said log information storing portion, and if said log information is not sent back, determines that trouble has occurred in said monitoring object apparatus; and 4) said separation processing unit of said apparatus further comprises a log information updating unit which updates said log information registered in said log information storing portion with said log information received from said monitoring object apparatus.

10. The apparatus according to claim 6, further comprising:
  an addition processing unit including:
  a selection unit that selects a first apparatus and a second apparatus from said plurality of apparatuses in said system; and a management information managing unit that registers an identifier of said apparatus of said plurality of apparatuses as a monitor identifier of said first apparatus and as a monitoring object identifier of said second apparatus, and that registers an identifier of said first apparatus as said monitoring object identifier, and registers an identifier of said second apparatus as said monitor identifier.

11. A method performed by an apparatus in a system comprising a plurality of apparatuses connected a network, wherein each apparatus in said plurality of said apparatuses exclusively monitor for an occurrence of trouble in a single monitoring object apparatus, which is one of the other apparatuses of the plurality of apparatuses, and is exclusively monitored by a single monitor apparatus, and with a management information storing portion of a storage apparatus in which a single monitoring object identifier and a single monitor identifier are registered, the method comprising the steps of:

monitoring a monitoring object apparatus indicated by said single monitoring object identifier; and responding to monitoring by a monitor apparatus indicated by said single monitor identifier; and a separation processing comprising the steps of when an occurrence of trouble in the monitor object apparatus is detected, searching for a search target apparatus, which is the apparatus monitored by the monitor object apparatus in said plurality of apparatuses in said system, wherein said searching step comprises the steps of searching for said search target apparatus by requesting other apparatuses in said plurality of apparatuses in said system to send back an identifier of the monitor object apparatus in each apparatus of said plurality of apparatuses, and determining said search target apparatus to be an apparatus which sends back an identifier which sends back an identifier which indicates the monitoring object apparatus of said apparatus:

changing said single monitoring object identifier registered in said storage apparatus to an identifier of said search target apparatus; and changing said monitor identifier registered in storage apparatus of said search target apparatus to an identifier of said apparatus.

12. The method according to claim 11, wherein the step of requesting is performed sequentially and begins with said monitor apparatus of said apparatus and then is sequentially made to monitor apparatus of succeeding apparatuses in said plurality of apparatuses until an apparatus sends back an identifier which indicates said the monitoring object apparatus of said apparatus in response to a request.

13. The method according to claim 11, wherein said searching step searches for said search target apparatus by requesting by broadcast to other apparatuses of said plurality of apparatuses in said system to send back an identifier corresponding to the single monitor identifier registered in storage apparatus of each apparatus of said plurality of apparatuses.

14. The method according to claim 11, further comprising the steps of:

selecting a first apparatus and a second apparatus from said plurality of apparatuses in said system;

registering in a management server if the system an identifier of said apparatus of said plurality of apparatuses as a monitor identifier of said first apparatus and as a monitoring object identifier of said second apparatus;

registering in said storage apparatus an identifier of said first apparatus as said single monitoring object identifier of said apparatus of said plurality of apparatuses, and registering in said storage apparatus an identifier of said second apparatus as said single monitor identifier of said apparatus of said plurality of apparatuses.

15. A computer readable storage medium tangibly embodying a program code of machine readable instructions executable by an apparatus, in a system comprising a plurality of said apparatuses connected to a network, wherein each apparatus in said plurality of apparatuses exclusively monitors for an occurrence of trouble in a single monitoring object apparatus, which is one of the other apparatuses of the plurality of apparatuses, and is exclusively monitored by a single monitor apparatus, and having a storage apparatus with management information storing portion in which a single monitoring object identifier and a single monitor identifier are registered, the program when executed performing the steps of:

monitoring a monitoring object apparatus indicated by said single monitoring object identifier; and responding to a monitor apparatus indicated by said single monitor identifier;

responding to a monitor apparatus indicated by said single monitor identifier, and when an occurrence of trouble in the monitor object apparatus is detected, searching for a search target apparatus, which is the apparatus monitored by the monitor object apparatus in said plurality of apparatuses in said system, wherein said searching step includes searching for said search target apparatus by requesting other apparatuses in said plurality of apparatuses in said system to send back an identifier of the monitor object apparatus in each apparatus of said plurality of apparatuses, and determining said search target apparatus to be an apparatus which sends back an identifier which indicates the monitoring object apparatus of said apparatus changing said single monitoring object identifier registered in said storage apparatus to an identifier of said target apparatus; and changing said monitor identifier registered in storage apparatus of said search target apparatus to an identifier of said apparatus.

16. A computer readable storage medium according to claim 15 wherein the step of requesting is performed sequentially and begins with said monitor apparatus of said apparatus and then is sequentially made to monitor apparatus of succeeding apparatuses in said plurality of apparatuses until an apparatus sends back said monitor an identifier which indicates said the monitoring object apparatus of said apparatus in response to a request.

17. A computer readable storage medium according to claim 15 wherein said searching step searches for said search target apparatus by requesting by broadcast to other apparatuses of said plurality of apparatuses in said system to send back an identifier corresponding to the single monitor identifier registered in storage apparatus of each apparatus of said plurality of apparatuses.

18. A computer readable storage medium according to claim 15 wherein said program further performs the steps of:

selecting a first apparatus and a second apparatus from said plurality of apparatuses in said system;

registering in a management server if the system an identifier of said apparatus of said plurality of apparatuses as a monitor identifier of said first apparatus and as a monitoring object identifier of said second apparatus;
registering in said storage apparatus an identifier of said first apparatus as said single monitoring object identifier of said apparatus of said plurality of apparatuses, and registering in said storage apparatus an identifier of said second apparatus as said single monitor identifier of said apparatus of said plurality of apparatuses.

* * * * *